United States Patent
Bellafiore et al.

(10) Patent No.: US 7,072,742 B1
(45) Date of Patent: Jul. 4, 2006

(54) ACCURATE BLENDING MODULE AND METHOD

(75) Inventors: Louis Bellafiore, Wilmette, IL (US); James Sanderson, Chicago, IL (US)

(73) Assignee: Technikrom, Inc., Evanston, IL (US)

( * ) Notice: Subject to any disclaimer, the term of this patent is extended or adjusted under 35 U.S.C. 154(b) by 40 days.

(21) Appl. No.: 10/688,391

(22) Filed: Oct. 17, 2003

(51) Int. Cl.
*G05B 21/00* (2006.01)

(52) U.S. Cl. ...................................... 700/265

(58) Field of Classification Search ................ 700/239, 700/265–272; 366/131–137, 143
See application file for complete search history.

(56) References Cited

U.S. PATENT DOCUMENTS

| | | | | |
|---|---|---|---|---|
| 4,013,413 A | * | 3/1977 | Stewart et al. ................. | 436/53 |
| 4,494,209 A | | 1/1985 | Agarwal | |
| 4,609,874 A | * | 9/1986 | Reich ........................... | 324/438 |
| 4,979,091 A | | 12/1990 | Albers | |
| 5,332,145 A | * | 7/1994 | Bell et al. ..................... | 228/105 |
| 5,522,660 A | * | 6/1996 | O'Dougherty et al. ...... | 366/136 |
| 5,800,056 A | * | 9/1998 | Suzuki et al. ................ | 366/152.4 |
| 5,924,794 A | | 7/1999 | O'Dougherty et al. | |
| 5,954,954 A | * | 9/1999 | Houck et al. ................. | 210/198.2 |
| 6,048,256 A | * | 4/2000 | Obeng et al. ................. | 451/60 |
| 6,120,175 A | * | 9/2000 | Tewell .......................... | 366/140 |
| 6,146,008 A | * | 11/2000 | Laederich et al. ............ | 366/136 |
| 6,161,060 A | * | 12/2000 | Collins ......................... | 700/239 |
| 6,186,193 B1 | * | 2/2001 | Phallen et al. ................ | 141/83 |
| 6,224,252 B1 | * | 5/2001 | Munroe et al. ............... | 366/132 |
| 6,280,692 B1 | * | 8/2001 | Bartlett, Jr. .................. | 422/131 |
| 6,286,566 B1 | * | 9/2001 | Cline et al. ................... | 141/83 |
| 6,290,384 B1 | * | 9/2001 | Pozniak et al. ............... | 366/136 |
| 6,395,915 B1 | | 5/2002 | Bellafiore et al. | |
| 6,533,449 B1 | * | 3/2003 | Auad ............................ | 366/132 |
| 6,554,162 B1 | | 4/2003 | Schell et al. | |
| 6,572,255 B1 | * | 6/2003 | Husher ......................... | 366/132 |
| 6,796,703 B1 | * | 9/2004 | Lemke .......................... | 1/1 |
| 2003/0170156 A1 | * | 9/2003 | Kemp et al. .................. | 422/224 |
| 2003/0174306 A1 | * | 9/2003 | Grant et al. ................... | 356/36 |
| 2004/0019462 A1 | * | 1/2004 | Gehrlein et al. .............. | 702/188 |
| 2004/0102380 A1 | * | 5/2004 | Fulton et al. .................. | 514/12 |

* cited by examiner

*Primary Examiner*—Maria N. Von Buhr
(74) *Attorney, Agent, or Firm*—DLA Piper Rudnick Gray Cary US LLP

(57) ABSTRACT

An accurate blending module for retrofitting existing laboratory or industrial systems or use as a standalone device and a method of use. The module includes a proportioning submodule that receives and merges at least two liquid feeds. The merged stream flows to a blending submodule. The resulting blended liquid stream flows through a detection submodule which detects a characteristic of the blended liquid stream. The detection submodule sends a corresponding signal to a controller. The controller adjusts the proportioning submodule based on the signal.

19 Claims, 6 Drawing Sheets

ACCURATE BLENDING MODULE AND METHOD

BACKGROUND OF THE INVENTION

The present invention relates generally to liquid blending systems and, in particular, to a module that blends two or more liquids together with high accuracy so that solutions having the desired concentrations of the components and/or other characteristics, such as pH, viscosity or optical density, etc., are created and a method for retrofitting industrial equipment and systems with the module to improve system performance.

The combining of two or more liquids together to a desired concentration and/or other characteristics, such as pH, viscosity or optical density, etc., of the constituent liquids is fundamental to many industrial processes and commercial products. This combining of liquids may be referred to as blending and is common in many industrial segments including pharmaceutical products, biopharmaceutical products, food and beverage processing products, household products, personal care products, petroleum products, chemical products and many other general industrial liquid products. In addition, blending systems find use in the field of liquid chromatography where blended liquids are provided to chromatography columns to permit the separation of mixtures for analysis or for purification purposes.

On site blending systems provide many advantages over purchasing pre-mixed chemicals. By using a blending system, a single barrel or feedstock concentrate produces many times its volume in diluted solution, depending on the desired concentration of the dilution. Thus, a single feedstock concentrate, used to produce the equivalent of many feedstocks of dilute liquid via a blending system, greatly reduces facility costs associated with fabrication of large tanks, floor space required, validation and quality control costs to confirm makeup, spoilage and disposal costs of non-compliant out of date or unused blended solutions. Freight costs associated with chemical delivery are also greatly reduced. In addition, onsite dilution and blending increases the variety of chemical concentrations and mixtures that are immediately available, without requiring a corresponding increase in the number of feedstocks and chemicals that must be purchased, thereby reducing facility and operating costs and providing the logistical and administrative advantage of reduced inventory.

High accuracy in terms of concentration for blending systems providing liquids to liquid chromatography systems is vital. In addition, quality control concerns favor increased blending accuracy for liquids that are provided to industrial processes and that are used to create commercial products. Indeed, Six Sigma quality control principles dictate that lower variability in an industrial process results in a greater percentage of higher quality products being produced by the industrial process.

It is well known, however, that it is common for different levels of a large feedstock tank filled with a solution to have different proportionate mixtures of the constituent liquids. Gradients exist in large feedstocks in terms of both concentration and temperature. As a result, liquid provided from the feedstock will vary in terms of concentration posing challenges for accurate analysis, quality control analysis, as well as uniform delivery to a process. Feedstock solvents, commercially supplied, have variations in actual concentration from batch to batch as well as innate impurities preventing 100% pure concentrations from being available in bulk supply.

FIG. 1 illustrates a prior art approach to blending a buffer or solvent solution with a diluting liquid such as water. Feedstocks, supplied from containers or tanks, are illustrated at 10a, 10b, 10c and 12. Feedstocks 10a through 10c contain different concentrations of buffer solution, for example, 0.1M, 0.5M and 1.0M buffer, respectively. Feedstock 12 contains water as a diluting liquid. It should be noted that feedstocks 10a, 10b and 10c could alternatively contain a solvent.

The system of FIG. 1 provides three blending modes, graphically illustrated at 14, 16 and 18. In the graphs illustrated at 14, 16 and 18, the x-axis represents time while the y-axis represents concentration. Graph 14 illustrates the isocratic blending mode where the buffer solution or solvent is provided to a process at a fixed concentration level or set point. Due to the inherent variability of feedstock 10a, the actual concentration delivered to the process, as illustrated at 14, will typically vary by $\geq$+/−2% from the set point/desired concentration.

Graph 16 of FIG. 1 illustrates the step gradient blending mode where the buffer solution is provided to the process at multiple concentration levels. In the example shown in FIG. 1, there are three concentration level steps, and thus, three set points. During the initial portion of buffer delivery, buffer of a lower concentration level is provided from feedstock 10a. After a period of time, the supply of buffer solution is switched from feedstock 10a to feedstock 10b so that a buffer solution having five times the concentration is provided. Finally, after a second period of time, the supply of buffer is switched from feedstock 10b to feedstock 10c so that a buffer solution having ten times the concentration (as compared to the buffer from feedstock 10a) is provided. As indicated at 16, such an approach passes on the innate feedstock variation of $\geq$+/−2% from the desired concentration levels.

Graph 18 in FIG. 1 illustrates the linear gradient blending mode where, for example, buffer solution or solvent from feedstock 10c is diluted with water from feedstock 12 so that the concentration of the buffer or solvent increases over time. In other words, the set point ramps up to a specified concentration level. As is known in the art, such blending is accomplished by adjusting the pumps or valves regulating the flow of liquid from feedstocks 10c and 12. While it is desired that the buffer concentration be increased linearly, as illustrated at 18, the resulting blend varies from the desired concentration by $\geq$+/−2% plus an additional variability of between +/−3% to +/−5%. In addition, due to the high variability, the buffer of feedstock 10c cannot be diluted with the water from feedstock 12 to accurately provide buffer having the concentrations of feedstocks 10a and 10b. The additional feedstocks 10a and 10b must be present in addition to feedstock 10c. In general, the variability indicated at 18 makes the linear gradient blending mode impractical for most applications.

As illustrated at 22 in FIG. 1, the variability for the three blending modes described above causes a variable and non-compliant product quality distribution. The graph 22 represents both the variability of the blend and the variability in product produced in processes relying on accurate blend makeup and delivery when the makeup blend is variable and inaccurate.

Accordingly, it is an object of the present invention to provide a blending system that is capable of blending and delivering liquids having precise concentrations of constituents in a highly reproducible fashion. Multiple concentrates can be connected to a single blending system to allow various dilutions.

It is another object of the present invention to provide a compact blending system that may be used to retrofit industrial systems, whether small scale bench top units or large scale manufacturing systems.

It is still another object of the present invention to provide a method for retrofitting industrial processes, including continuous processes such as SMB (Simulated Moving Bed).

SUMMARY OF THE INVENTION

The present invention is directed to an accurate blending module for retrofitting existing laboratory or industrial systems or use as a standalone device and a method of use. The accurate blending module includes a proportioning submodule adapted to receive and merge at least two liquid feeds. A blending submodule communicates with the proportioning submodule and blends the merged liquid stream. A detection submodule communicates with the blending submodule so that a blended liquid stream from the blending submodule flows therethrough. The detection submodule detects a composition of the blended liquid stream and communicates it to a controller. The controller is also in communication with the proportioning submodule and adjusts the proportioning submodule based upon the detected composition so that a desired composition is provided by the accurate blending module. The proportioning, blending and detection submodules are integrated together, resulting in the accurate blending module.

The accurate blending module also includes a purge valve in communication with the outlet of the detection submodule that communicates with the controller so that the controller opens the purge valve when the detected composition exceeds a predetermined tolerance. The blending submodule may optionally include a pump to blend the liquid feeds and delivers the merged stream to the detection submodule.

The following detailed description of embodiments of the invention, taken in conjunction with the appended claims and accompanying drawings, provide a more complete understanding of the nature and scope of the invention.

DESCRIPTION OF THE PREFERRED EMBODIMENTS

Figure 2:
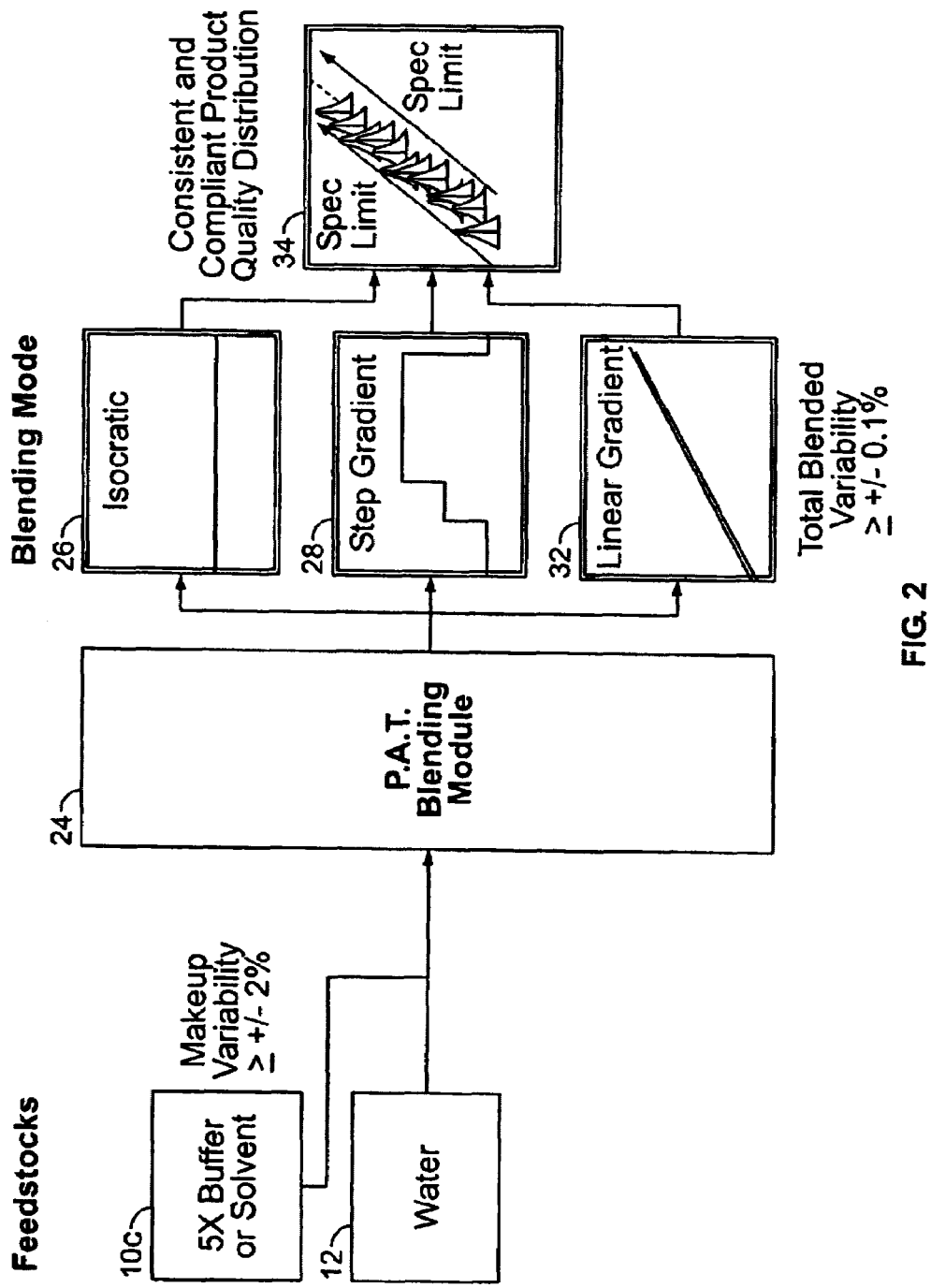
FIG. 2 is a flow diagram illustrating approaches to blending using an embodiment of the accurate blending module and method of the present invention and the impact on product variability.

With reference to FIG. 2, an embodiment of the accurate blending module of the present invention 24 has been has placed in communication with feedstocks 10c and 12. While the buffer or solvent from feedstock 10c varies $\geq$+/−2% from the desired concentration levels, the accurate blending module 24 can provide a blended variability of only +/−0.1% for each of the isocratic, step gradient and linear gradient blending modes, as illustrated at 26, 28 and 32, respectively.

Due to the precision blending provided by the module 24, feedstocks 10a and 10b are no longer required as the concentrations provided thereby may be obtained instead by blending buffer from feedstock 10c and water from feedstock 12. As illustrated by the liquid chromatography results illustrated at 34, the arrangement of FIG. 2 provides consistent and compliant product quality distribution.

Figure 3:
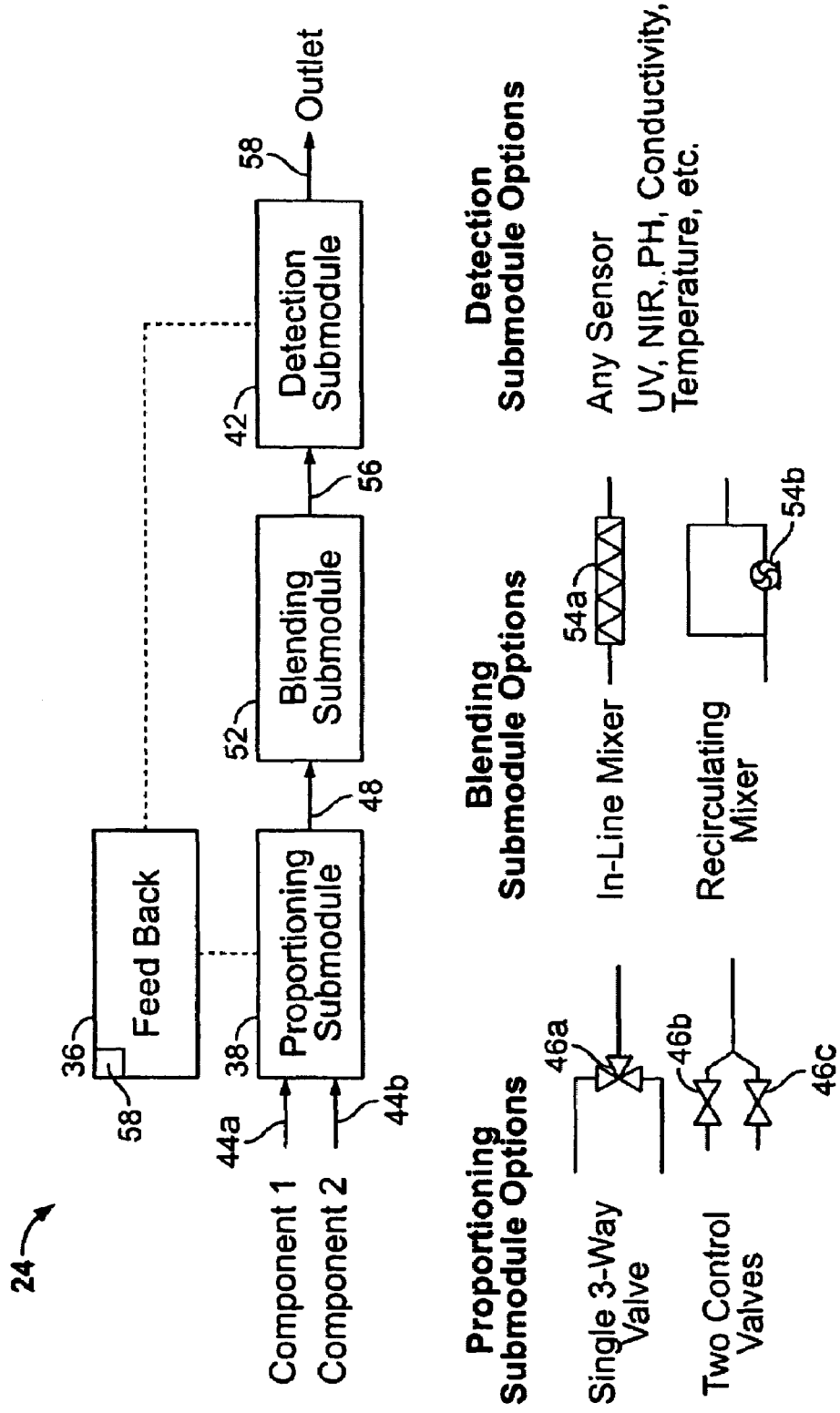
FIG. 3 is a schematic of an embodiment of the accurate blending module of the present invention.
Figure 4:
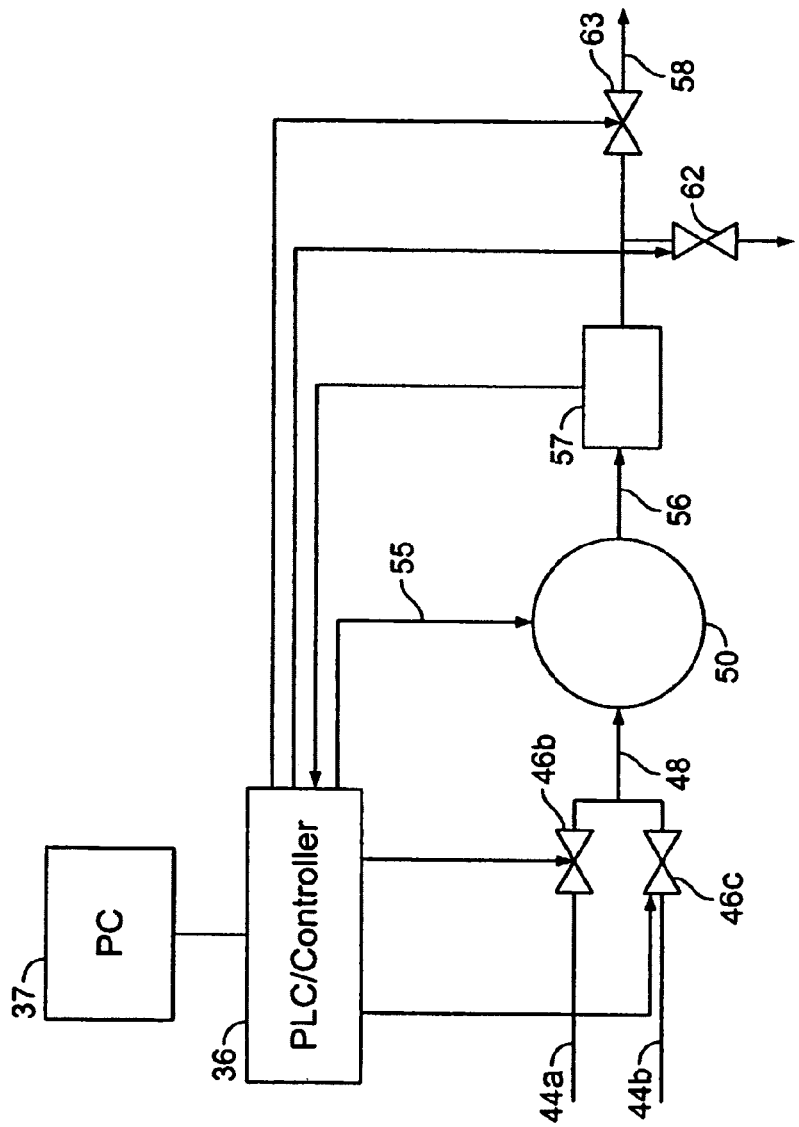
FIG. 4 is a schematic of the module of FIG. 3 providing greater detail of the components.
Figure 6:
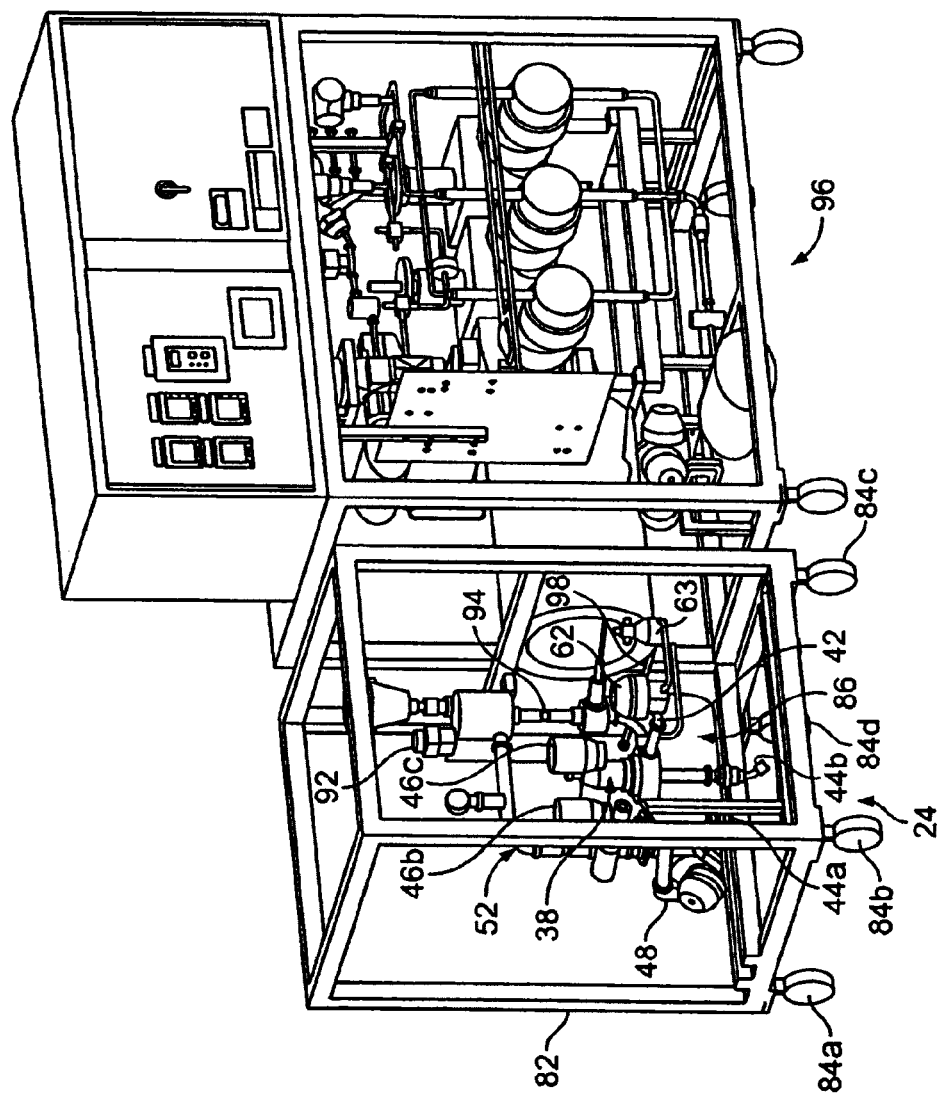
FIG. 6 is a perspective view of an industrial system retrofitted with an embodiment of the blending module of the present invention in accordance with the method of the present invention.

The details of an embodiment of the accurate blending module, indicated in general at 24, are presented in FIGS. 3 and 4. A programmable logic controller (PLC) 36, or onboard controller that communicates with an external personal computer (PC), indicated at 37 in FIG. 4, communicates with a proportioning submodule 38 and a detection submodule 42. With the latter configuration, the onboard controller communicates with the PC via an Ethernet connection or a serial port connection. Alternatively, a soft PLC approach, whereby software residing on the PC eliminates the need for an onboard PLC, could be employed. With such an arrangement, however, a hardware controller (but not a PLC) may still be required on the module skid (FIG. 6).

The sensor (57 in FIG. 4) of the detection submodule 42 of FIG. 3 is calibrated prior to use with the critical or variable feed (such as buffer or solvent) concentration tuned to the desirable sensor output level, typically 100% or full scale. The sensor output is zeroed with water.

Two customer-supplied liquid feeds 44a and 44b are connected to the proportioning submodule 38. It should be noted that while two feeds are illustrated, additional feeds are within the scope of the present invention. The proportioning submodule continuously merges the two separate incoming liquid streams (such as a salt concentrate solution and purified water) with valving into one stream. As illustrated in FIG. 3 at 46a and 46b, 46c, respectively, the valving of proportioning submodule 38 may be either a single 3-way valve or two control valves that are automated and communicate with PLC 36 or PC 37 (if the soft PLC approach is implemented) in the manner described below. The two control valve arrangement (46b and 46c) is illustrated in FIG. 4. Valves 46a, 46b and 46b may be any type of valve that may be automated. Examples include diaphragm valves, ball valves and needle valves which may be controlled in a digital or analog fashion.

The merged liquid stream 48 exiting the proportioning submodule 38 is mixed within a fixed volume (50 in FIG. 4) in blending submodule 52 to ensure that the mixture is fully blended. As illustrated at 54a and 54b in FIG. 3, the blending submodule may utilize an in-line mixer 54a or a recirculating mixer 54b, both of which are known in the art, positioned within the fixed or variable volume 50 of FIG. 4. Alternatively or in addition to dynamic mixing, static mixing may also be used in the blending submodule 52. The volume of the blending submodule is selected based upon the total flow requirement for the module (how much buffer or solvent is needed at what flow rate). It should be noted that either a fixed mixing rate or volume or a variable mixing rate or volume may be used in the blending submodule. As illustrated at 55 in FIG. 4, if dynamic mixing is used, the mixing device may be controlled by the PLC 36 or PC 37.

The blended liquid stream 56 exiting the blending submodule 52 encounters the detection submodule 42. An ionic (e.g. conductivity or pH for a salt solution) or spectral (e.g.

near-infrared or ultraviolet for an alcohol or other solvent solution) measurement of the blend, as appropriate, is taken by an in-line sensor, indicated at 57 in FIG. 4, within the detection submodule 42.

As indicated in FIG. 3, the detection submodule may use a range of sensor types including NIR, conductivity, temperature, pH etc. Basically any sensor that can detect specific properties of the critical (or variable) feed and outputs a measurable signal may be used. Typically the signal is analog, but it may be digital. Examples of suitable sensors include fixed or variable wavelength near infrared or ultraviolet sensors (such as those manufactured by Wedgewood, Foss, Custom Sensors, Optek and Knauer), pH sensors (such as those manufactured by TBI Bailey and Yokagawa) and conductivity sensors (such as those manufactured by TBI Bailey and Wedgewood). The sensor 57 within the detection submodule 42 communicates the composition of the blended liquid stream with the PLC 36 or PC 37.

The outputted signal from the sensor 57 (FIG. 4) of the detection submodule 42 (FIG. 3), which is typically analog, provides the PLC 36 or PC 37 with a Process Value (PV) for a software PID (gain, integral, derivative) feedback loop. A Set Point (SP) for the software feedback loop will have been set in the PLC 36 or PC 37 by the user via a user interface 58 (FIG. 3) which may be the PC 37 of FIG. 4. Based on the discrepancy between the measured PV and the user-defined SP, the PLC's (or PC's) software PID feedback mechanism continually adjusts the signal that is sent to the automated valving of proportioning submodule 38, which are valves 46b and 46c in the embodiment of FIG. 4. This signal is called the Output. The Output signal causes constant adjustments in the proportioning submodule valves' opening/closing such that the PV continuously matches the SP. The Output signal is scaled by the software of the PLC or PC to a process value (such as molarity or concentration).

Figure 5:
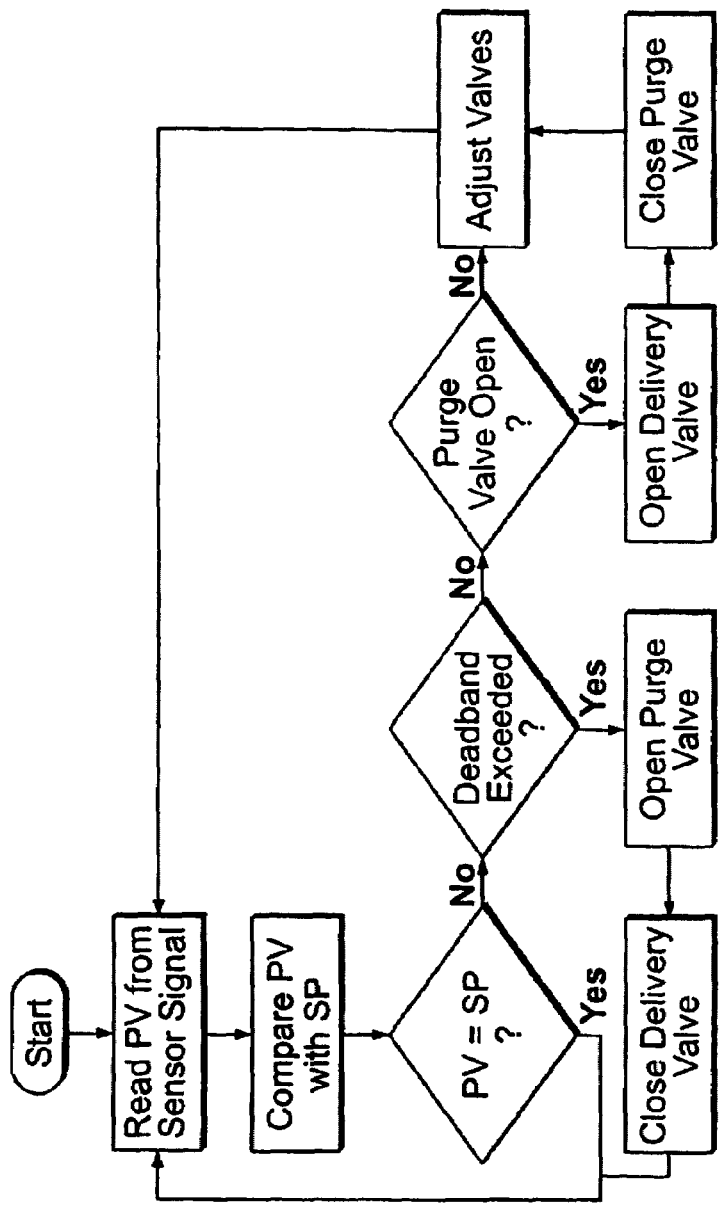
FIG. 5 is a flow chart illustrating the processing performed by the software of the PLC or PC of FIGS. 3 and 4.

In summary:

SP=set point=user defined value or blending percentage
PV=process value=measured value that is coming from the measuring sensor
Output=continuously adjusting signal that the software is programmed to send to the mixing valves that allows the measured PV to approach the user-defined SP FIG. 5 is a flowchart illustrating the processing performed by the software of the PLC or PC in performing the above steps. While busses are not required for the PLC or PC to control the valves, etc., they provide faster speed and response for the module. As an example, Profibus may be used for valve control while Foundation Fieldbus may be used for the other signals. As advances in process control software and hardware become available, these faster speed options can be used to further improve performance and reliability.

As indicated in FIG. 5, there is also a user-specified "deadband" or acceptable tolerance for the Process Value. If the PV falls outside of the SP by a value greater than the deadband during the process, then a purge valve, illustrated at 62 in FIG. 4, will open and a delivery valve, illustrated at 63 in FIG. 4, will close to divert the out-of-spec liquid away from the rest of the system. Meanwhile, the software PID loop attempts to correct the liquid blend. Once corrected, the liquid is directed back to the system.

The precisely mixed merged stream, indicated at 58 in FIGS. 3 and 4, which has now been verified as accurate since the software has enabled the PV to match the SP, is then delivered.

As an example, after a calibration of sensor response with appropriate buffer and water, a user has purified water connected to one inlet of the module and 1M NaCl solution connected to the second inlet of the module. The user specifies the SP as 0.1M NaCl. The module's software will adjust the behavior of the blending valves such that the measured PV detected by, in this case, the conductivity sensor, shall be as close to the reading corresponding to 0.1M NaCl as possible.

As illustrated in FIG. 6, an embodiment of the accurate blending module of the present invention, indicated in general at 24, includes a skid 82 upon which the components of FIGS. 3 and 4 are mounted. The skid 82 features rollers 84a, 84b, 84c and 84d so that the module may be easily rolled across a surface, although fixed installations are also possible.

Figure 1:
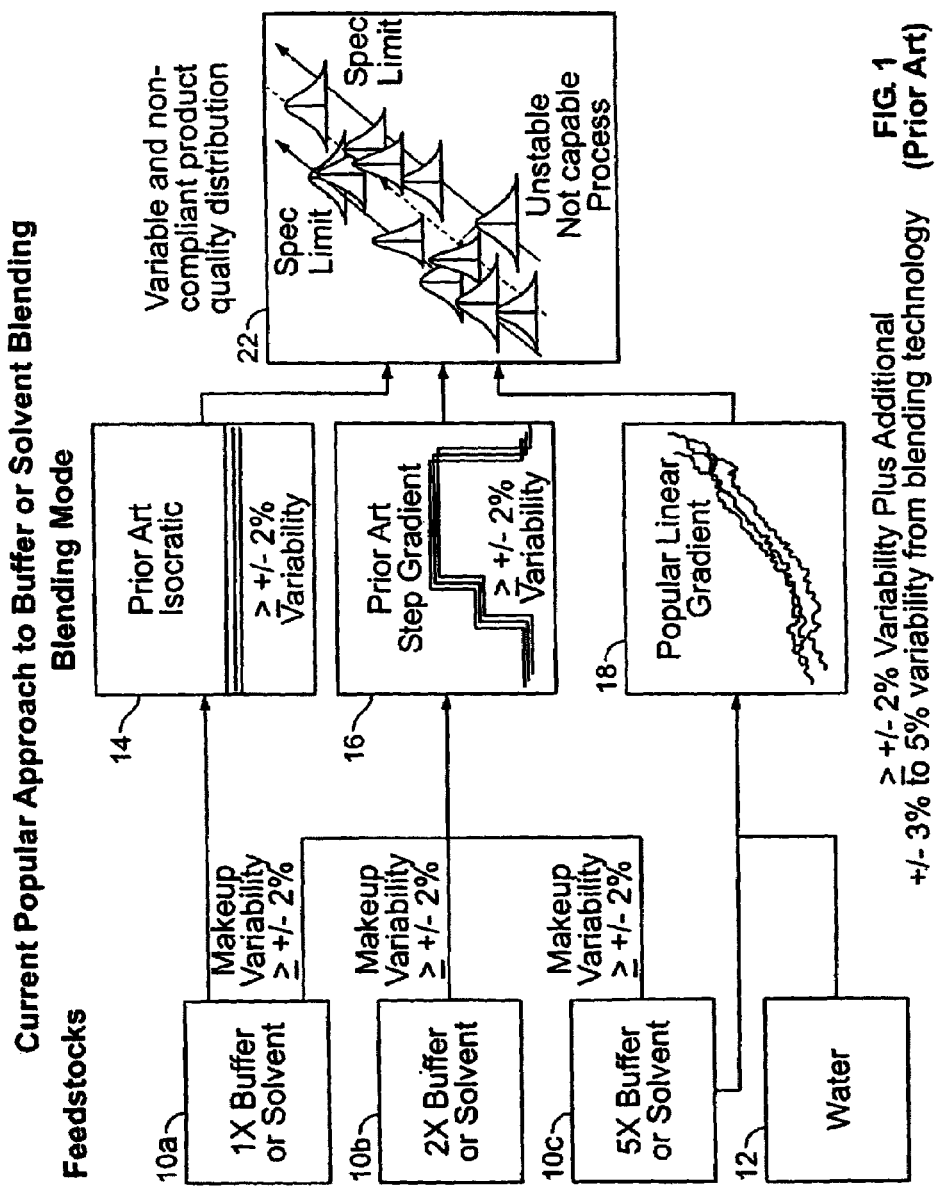
FIG. 1 is a flow diagram illustrating prior art approaches to blending buffers or solvents with a diluting liquid such as water and the resulting product variability.

The module 24 may optionally include a pump, illustrated at 86 in FIG. 6, that blends the liquid from feedstocks, such as those illustrated 10a–10c and 12 in FIGS. 1 and 2, which are delivered through the liquid feeds 44a and 44b to the proportioning submodule 38. In FIG. 6, the proportioning submodule takes the form of two control valves. After leaving the proportioning submodule, the liquid stream, 48 in FIGS. 3 and 4, travels through line 48 to the blending submodule 52. In FIG. 6, the blending submodule takes the form of a recirculating and fixed volume mixer. Blending submodule 52 optionally includes a bubble trap 92 so that the blended liquid stream (corresponding to blended liquid stream 56 in FIGS. 3 and 4) traveling through line 94 to the detection submodule 42 does not contain bubbles.

As described previously, the liquid exiting the detection submodule travels through either valve 62 or 63. If travel is through the latter valve, the liquid can be delivered to an existing process, or system, as indicated in general at 96, through line 98. The stream traveling through line 98 corresponds to the precisely mixed stream 58 in FIGS. 3 and 4. It is to be understood that the complete blending module can be connected to an existing system by means of a single tubing connection, as illustrated in FIG. 6, or alternatively can be used in a stand-alone way to generate adaptively-controlled liquid blends.

The accurate blending module integrates with the existing process in ways ranging from a simple relay switch closure which defines the module's start/stop points, to a complete renovation of any existing controller hardware and software permitting replacement with or installation of latest version hardware and software for optimized performance. For a simple switch, or contact closure, the existing system must send a digital output to the module that signals the module to initiate its blending procedure, or stop its blending procedure. For a complete hardware and software replacement, the existing controller hardware, such as a programmable logic controller, is removed and replaced with updated hardware, software and PC.

The module is built from various components, such as valves, pumps, and sensors that are sized and specified for use with the existing system and/or the processes for which it will be used.

The present invention thus is a portable closed-system unit that upgrades an existing pharmaceutical/biopharmaceutical/nutraceutical/fine chemical/industrial process pumping system to permit precise and reproducible buffer and/or solvent blends to be delivered from the existing system. These precise buffer and/or solvent blends can be leveraged by the equipment user to greatly enhance their particular biopharmaceutical/nutraceutical/fine chemical/industrial process of interest. In addition, the present invention offers a standalone blending system that may provide liquids containing constituents at precise concentration levels and/or desired characteristics such as pH, viscosity or optical density, etc., to any process or process equipment that may benefit from reduced variability and increased reproducibility and robustness.

While the preferred embodiments of the invention have been shown and described, it will be apparent to those skilled in the art that changes and modifications may be made therein without departing from the spirit of the invention, the scope of which is defined by the appended claims.

What is claimed is:

1. A portable accurate blending module for retrofitting existing laboratory or industrial systems comprising:
   a) a proportioning submodule adapted to receive and merge at least two liquid feeds;
   b) a blending submodule in communication with the proportioning submodule, said blending submodule blending a merged liquid stream received from the proportioning submodule;
   c) a detection submodule in communication with the blending submodule so that a blended liquid stream from the blending submodule flows therethrough, said detection submodule detecting a characteristic of the blended liquid stream;
   d) a controller in communication with the detection submodule so that the characteristic of the blended liquid stream may be received therefrom,
   e) said controller also in communication with the proportioning submodule and adjusting the proportioning submodule based upon the detected characteristic;
   f) a skid upon which the proportioning, blending and detection submodules are mounted; and
   g) means for connecting the accurate blending module to the existing laboratory or industrial system.

2. The accurate blending module of claim 1 wherein the skid is provided with rollers so that the skid may be rolled across a surface.

3. The accurate blending module of claim 1 further comprising a purge valve in communication with an outlet of the detection submodule, said purge valve in communication with the controller so that said controller opens the purge valve when the detected characteristic exceeds a predetermined tolerance.

4. The accurate blending module of claim 1 wherein the controller includes a programmable logic controller.

5. The accurate blending module of claim 1 wherein the controller includes a personal computer.

6. The accurate blending module of claim 1 wherein the blending submodule includes a pump.

7. The accurate blending module of claim 1 wherein the controller also communicates with the blending submodule.

8. The accurate blending module of claim 1 wherein the proportioning submodule includes a valve.

9. The accurate blending module of claim 1 wherein the blending submodule includes an in-line mixer.

10. The accurate blending module of claim 1 wherein the blending submodule includes a recirculating mixer.

11. The accurate blending module of claim 1 wherein the blending submodule includes a fixed volume.

12. The accurate blending module of claim 1 wherein the blending submodule includes a bubbletrap.

13. The accurate blending module of claim 1 wherein the detection submodule includes an ultraviolet sensor.

14. The accurate blending module of claim 1 wherein the detection submodule includes an conductivity sensor.

15. The accurate blending module of claim 1 wherein the detection submodule includes a near infrared sensor.

16. The accurate blending module of claim 1 wherein the detection submodule includes a pH sensor.

17. A method for retrofitting a laboratory or industrial system so that it receives an accurately blended liquid stream including the steps of:
   a) providing a portable accurate blending module having a proportioning submodule, a blending submodule, a detection submodule and a controller;
   b) connecting at least two liquid feeds to the accurate blending module;
   c) connecting the accurate blending module to the existing laboratory or industrial system;
   d) merging the two liquid feeds with the proportioning submodule of the accurate blending module so that a merged liquid stream is produced;
   e) blending the merged liquid stream with the blending submodule of the blending module of the accurate blending module so that a blended liquid stream is produced;
   f) detecting a characteristic of the blended liquid stream and generating a corresponding signal with the detection submodule of the accurate blending module; and
   g) receiving the signal with the controller and adjusting the proportioning submodule with the controller based upon the received signal.

18. A portable module for blending liquids comprising:
   a) a proportioning submodule adapted to receive and merge at least two liquid feeds;
   b) a blending submodule in communication with the proportioning submodule, said blending submodule blending a merged liquid stream received from the proportioning submodule;
   c) a detection submodule adapted to connect to a laboratory or industrial system and in communication with the blending submodule so that a blended liquid stream from the blending submodule flows therethrough and to the laboratory or industrial system, said detection submodule detecting a characteristic of the blended liquid stream;
   d) a controller in communication with the detection submodule so that the characteristic of the blended liquid stream may be received therefrom; and
   e) said controller also in communication with the proportioning submodule and adjusting the proportioning submodule based upon the detected characteristic.

19. The accurate blending module of claim 18 further comprising a purge valve in communication with an outlet of the detection submodule, said purge valve in communication with the controller so that said controller opens the purge valve when the detected characteristic exceeds a predetermined tolerance.

* * * * *